United States Patent [19]
Seufer et al.

[11] 3,941,097
[45] Mar. 2, 1976

[54] ROTARY COMBUSTION ENGINE HAVING IMPROVED IGNITION MEANS

[75] Inventors: Theo Seufer, Neckarsulm; Richard van Basshuysen, Bad Wimpfen, both of Germany

[73] Assignees: Audi NSU Auto Union Aktiengesellschaft, Neckarsulm; Wankel GmbH, Lindau, Bodensee, both of Germany

[22] Filed: May 30, 1974

[21] Appl. No.: 474,668

[30] Foreign Application Priority Data
June 9, 1973    Germany............................ 2329686

[52] U.S. Cl............................. 123/8.09; 123/169 PA
[51] Int. Cl.²......................................... F02B 53/12
[58] Field of Search .. 123/8.01, 8.09, 8.45, 169 PA, 123/191 S, 191 SP, 32 K, 32 SP

[56] References Cited
UNITED STATES PATENTS

| | | | |
|---|---|---|---|
| 2,057,390 | 10/1936 | Metailler | 123/169 PA X |
| 2,127,512 | 8/1938 | Harper | 123/169 PA X |
| 3,597,648 | 8/1971 | Shibagaki et al. | 123/8.09 X |
| 3,719,174 | 3/1973 | Lamm | 123/8.09 |

FOREIGN PATENTS OR APPLICATIONS
537,721   3/1922   France.......................... 123/169 PA

*Primary Examiner*—Carlton R. Croyle
*Assistant Examiner*—Michael Koczo, Jr.
*Attorney, Agent, or Firm*—Arthur Frederick; Raymond P. Wallace

[57] ABSTRACT

The improved ignition means for a rotary combustion engine of the type, having a rotor which planetates within a multi-lobed housing cavity which is partly defined by an inner peripheral wall surface, comprises a spark plug having an axis which extends substantially normal to the peripheral wall surface and has means forming a spark-gap disposed in an ante-chamber adjacent the inner peripheral wall surface. An ignition channel of small size in relation to the size of the ante-chamber extends from the ante-chamber through the peripheral wall surface and is disposed in offset substantially parallel relationship with the longitudinal axis of the spark plug.

6 Claims, 4 Drawing Figures

U.S. Patent  March 2, 1976  3,941,097
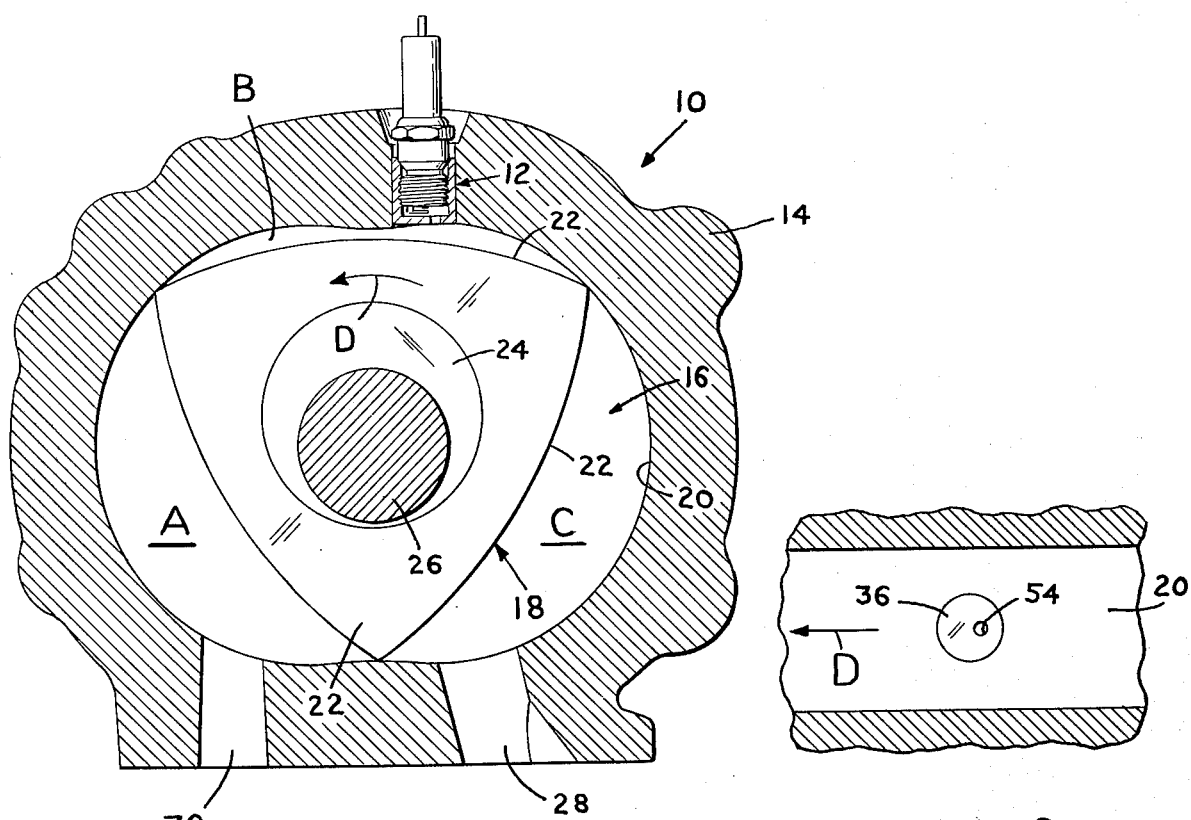
FIG. 1
FIG. 2
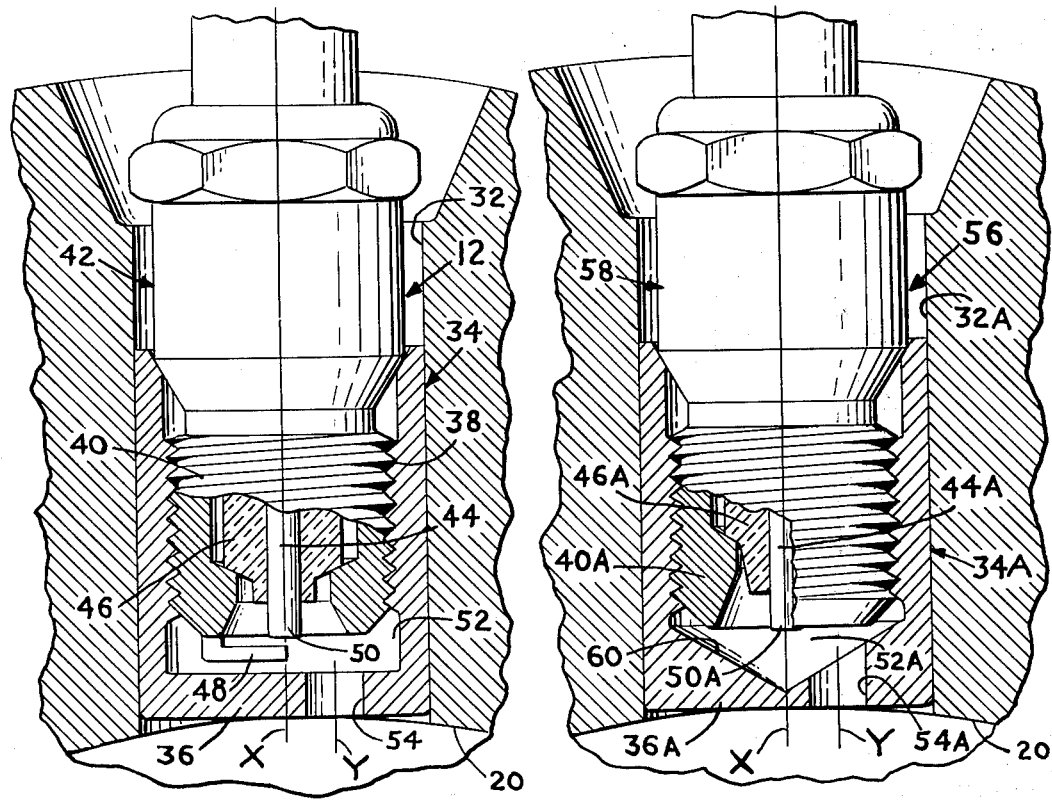
FIG. 3
FIG. 4

ROTARY COMBUSTION ENGINE HAVING IMPROVED IGNITION MEANS

The invention relates to rotary internal combustion engines of the type having a multi-lobed housing cavity within which a rotor is supported for planetary rotation, such as of the Wankel type disclosed in the U.S. Pat. to Wankel et al., No. 2,988,065. More specifically the invention concerns an improved ignition apparatus for such rotary internal combustion engines.

BACKGROUND

In rotary internal combustion engines of the type such as exemplified in the aforesaid U.S. Patent to Wankel, various ignition devices and arrangements have been employed to ignite the fuel and air mixture within the working chambers of the engine. In these various devices the igniting device, such as a spark plug having a central electrode disposed in an insulator with one end portion projecting therefrom and forming one part of a spark-gap, is supported in the housing so that the end of the spark plug lies in close spaced relationship to the inner peripheral surface of the housing. To minimize gas leakage from the working chamber within which the fuel-air mixture is being compressed past the apex seals of the rotor, through the spark plug opening and into the next working chamber under lower pressure, the spark plug opening in the inner peripheral wall surface is closed and an ignition opening or channel is provided in the closure. As exemplified in the U.S. Patents, Weed, No. 2,020,089; Lamm, No. 3,719,174; Berkowitz, No. 3,722,480; Belzner, No. 3,512,907; and Shibagaki, No. 3,597,648, the ignition channel is of relatively small size, as compared with the size of the ante-chamber, and communicates the latter with the working chambers. In these ignition devices it has been found that auto-ignition occurs by reason of incandescence of deposits in the spark plug region. The extent of such deposits are dependent on two factors, namely, ash content of the oil employed for lubrication and the temperature of the residue carrier or surface, such as the spark plug and surfaces of the ignition channel and ante-chamber. The obvious solution to this problem is to employ ash-free oils and/or lower the operating temperature of the spark plug.

It has been proposed to effect a lower spark plug temperature, as shown in the U.S. Patent to Lamm, No. 3,719,174; and an East German Patent No. 37,392, by providing two inclined ignition channels which serve to scavenge the ante-chamber with fresh fuel and air mixture and thus produce cooler spark plug temperatures. These ignition devices have not achieved an appreciable reduction in incandescence because of encrustation on the surfaces of the two ignition channels which is attributable to their relatively long length and inclination. Also the two ignition channels for achieving turbulence in the ante-chamber did not produce any noteworthy lowering of the spark plug temperature.

Another proposal for the solution to this problem is disclosed in the U.S. Patent to Braun et al, No. 3,738,331. This ignition device, having spark plugs extending through two housing elements and involving complex and expensive machining operations to fabricate, again shows an inclined ignition channel of relatively long length although it does disclose prevention of direct hot gas impingement and heat radiation on the insulator supporting the center electrode.

It is therefore an object of this invention to provide an improved ignition device for a rotary internal combustion engine which effectively lowers the operating temperature of the firing means and adjacent surfaces and thereby achieves a reduction in deposits and possibility of auto ignition.

SUMMARY

The present invention therefore contemplates an improved ignition device or means for an internal combustion engine of the type having a housing with an inner, trochoidal-shaped, peripheral wall surface, which defines a multi-lobe cavity and in which a rotor is eccentrically supported for planetary motion, the rotor periphery defining with the housing cavity a plurality of working chambers which successively expand and contract in volumetric size as the rotor rotates.

The improved ignition means comprises a spark plug of any suitable conventional construction such as the type having an insulator portion supporting an elongated electrode with one end portion thereof extending therefrom and forming part of a spark-gap. A support means is provided in the housing to receive and secure the spark plug so as to extend substantially normal to the adjacent area of the inner peripheral wall surface. The support means also supports the spark plug so that an ante-chamber is defined adjacent the spark-gap end of the spark plug, which ante-chamber is in relatively close spaced relationship to the inner, peripheral wall surface. A spark or ignition channel is provided to communicate the ante-chamber with the working chambers. In accordance with this invention, the ignition channel is small in size relative to the size of the ante-chamber and is disposed with its longitudinal axis offset and extending substantially parallel to the longitudinal axis of the spark plug.

It has been found that this improved ignition device has reduced spark plug temperature, under full engine load, by more than 100° Centigrade which has been sufficient to prevent incandescence of residues which may adhere to the surfaces on the spark plug and adjacent regions. Particularly favorable results were obtained with the ignition channel offset in the peripheral direction counter to the direction of rotation of the rotor; that is, normal to the axis of rotation and in relation to the electrode, counter to the direction of rotor rotation. An offset of the ignition channel in a direction parallel to the axis of rotor rotation has also produced a lowering of spark plug temperature and hence incandescence of residue build-up. In an engine utilizing the improved ignition device of this invention, the ignition channel had a diameter of 5 mm and was offset from an imaginary extension of the longitudinal axis of the electrode a distance of 3.5 mm, the ante-chamber being of 18 mm in diameter.

The ante-chamber of this invention may have a flat surface or a substantially inverted conical surface.

The invention contemplates that the support means may be either a bore in the housing terminating in close spaced relation to the inner peripheral wall surface of the housing or a cylindrical sleeve having a closed end and inserted in a bore extending through the inner peripheral wall surface with the closed end adjacent the latter. Also, the support means may be a combination of the two alternatives where an insert, such as disclosed in the U.S. Patents to Berkowitz, No. 3,722,480 or Belzner, No. 3,512,907, is employed. The sleeve and insert may be fabricated of material having high heat conductivity, (e.g., copper) and may be secured in the housing bore by a shrink fit, press-fit, or cast in the bore.

BRIEF DESCRIPTION OF DRAWINGS

The invention will be more fully understood from the following description when considered in connection with the accompanying drawings in which:

FIG. 1 is a semi-schematic cross-sectional view of a rotary internal combustion engine having an improved ignition device according to this invention;

FIG. 2 is a fragmentary view, in elevation, of the peripheral inner wall surface of the engine housing in the area of the improved ignition device shown in FIG. 1;

FIG. 3 is a fragmentary view of the ignition device shown in FIG. 1 and on a somewhat enlarged scale; and FIG. 4 is a view, similar to FIG. 3, of a second embodiment of the present invention showing an alternative spark plug and sleeve which may be employed without departure from the scope and spirit of the invention.

DESCRIPTION OF THE PREFERRED EMBODIMENTS

Now referring to the drawings, and more particularly FIGS. 1 and 2, the reference number 10 generally designates a rotary internal combustion engine, such as of the Wankel type, and number 12 designates an ignition means or device in accordance with this invention. The engine 10 has a housing 14 which defines therein a cavity 16 within which a rotor 18 is eccentrically supported for planetary rotary motion. The housing 14 has an inner, peripheral wall surface 20 which may be of trochoidal configuration. As shown, cavity 16 has a two-lobe configuration and a rotor 18 has three peripheral flank portions 22 so that the rotor has a generally triangular profile. The invention, however, is not limited to an engine 10 having a two-lobe housing cavity and a triangular shaped rotor, but may, without departure from the scope and spirit of the invention, have one or more than two lobes and a rotor having two or more flank portions in accordance with the relationship of one more flank portion of the rotor than the number of lobes in the cavity. The rotor 18 is rotatively supported on an eccentric 24 of a mainshaft 26 which is suitably supported within housing 14 by conventional bearing means not shown. The rotor 18 defines with housing 14 a plurality of working chambers A, B and C within cavity 16 which chambers, as the rotor planetates within the cavity, volumetrically, successively expand and contract in size. To provide for the passage of a combustible mixture, from a suitable source thereof (not shown), into working chambers A, B and C, an inlet or intake port 28 is provided in housing 14. For the discharge of spent products of combustion from working chambers A, B and C, an outlet or exhaust port 30 is also provided in housing 14. The igniting or firing of the combustible mixture, such as gasoline and air, is provided by ignition device 12. During engine operation the working chambers A, B and C have a cycle of operation which includes the four phases of intake, compression, expansion and exhaust, these phases being similar to the strokes in a reciprocating-piston type internal combustion engine of the 4-stroke cycle. To provide for improved engine operation and increased operative life of a spark-firing means and reduction in the possibility of engine auto-ignition, the improved ignition device 12 is provided.

As best shown in FIG. 3, ignition device 12 comprises, in part, a bore 32 in housing 14 which extends from the exterior of the housing through peripheral wall surface 20 and substantially normal to wall surface 20. A cup-shaped insert or sleeve 34, having a bottom or closed end wall 36, is disposed in bore 32 with the wall 36 lying substantially flush with the peripheral wall surface 20. The sleeve 34 is secured in bore 32 by shrinking, press-fitting, being cast into the housing 14, or other suitable means. The sleeve 34 may be fabricated of material having high heat conductivity, such as copper. The sleeve 34 is internally threaded at 38 to receive the threaded shank 40 of an igniter 42, such as a spark plug.

The spark plug 42 is of any conventional construction which may be of the type having an elongated central electrode 44 supported substantially coaxially of the longitudinal axis X of the spark plug in an electrical isolator or insulation portion 46 disposed in shank 40. The spark plug may also be provided with a grounded electrode 48 disposed in close spaced relation to the end portion 50 of electrode 44. The electrode 48 and end portion 50 coact to define therebetween a spark-gap across which an electrical spark is caused to intermittently bridge or jump. The spark plug shank 40 is dimensioned in relation to sleeve 34 so that the end portion of shank 40 is in close spaced relation to the inner surface of wall 36 and defines with sleeve 34 an ante-chamber 52.

In order for the spark plug 42 to ignite the combustible mixture in the working chambers A, B and C, an ignition opening or channel 54 is provided in wall 36 of sleeve 34. In accordance with this invention ignition channel 54 is of small size in relation to the size of ante-chamber 52 and is located in offset relation to the longitudinal axis X of spark plug 42 and with its longitudinal axis Y extending substantially normal to the adjacent inner wall surface 20, or as shown in the drawings, ignition channel 54 is arranged with its longitudinal axis Y extending substantially parallel to axis X. Also as best shown in FIG. 2, ignition channel 54 is preferably offset relative to axis X of spark plug 42 in a direction counter to the direction of rotation of rotor 18 shown by the arrow D since the arrangement produces the best results. However, the offset of ignition channel 54 can be in the direction of rotor rotation relative to the axis X of the spark plug to achieve improved results over the conventional ignition devices. The ignition channel 54, although not shown in the drawing, may also be offset relative to spark plug axis X in a direction parallel to the axis of mainshaft 26 to again provide improved results over conventional ignition devices.

This offset and substantially parallel relation of ignition channel 54 relative to the axis of spark plug 42, by actual engine tests, has achieved a lowering of the spark plug temperature under full load of about 100° Centigrade or more and that such reduction in temperature has obviated incandescence of residue deposits in the spark plug region and undesirable auto-ignition operation of the engine. This improvement is believed achieved by preventing the direct impingement of hot combustion gases on the spark plug insulator 46 of the spark plug and heat radiation as well as for the reason that the size of ante-chamber 52 and the length of ignition channel 54 are relatively small thereby minimizing the amount of surface upon which residues can adhere. In one test, the engine was provided with an ignition device having an offset amounting to 3.5 mm with an ignition channel 54 of a diameter of 5 mm while the ante-chamber 52 diameter measured 18 mm.

In FIG. 4 is shown another embodiment of the present invention wherein ignition device 56 differs only in the type of spark plug employed and the configuration of the inner surface of the bottom wall of the sleeve or insert. The parts of ignition device 56 corresponding to like parts of ignition device 12 shall be designated by the same reference number but with the suffix A added thereto.

As shown in FIG. 4, a spark plug 58 is of the type wherein a spark-gap is defined between end portion 50A of electrode 44A and the shank portion 40A of the spark plug. Also, the inner surface of wall 60 of sleeve 34A has an inverted conical configuration instead of flat, planar shape as shown in ignition device 12 (see FIG. 3). In all other respects the ignition device 56 is structurally the same as ignition device 12 and achieves the same improved results.

Although two embodiments of the invention have been illustrated and described in detail, it is to be expressly understood that the invention is not limited thereto. For example, the kind of spark plug used is not a critical element of invention, spark plugs having a plurality of grounded electrodes may be employed as well as the single grounded electrode type. Various other changes may be made in the arrangement of parts without departing from the spirit and scope of the invention, as the same will now be understood by those skilled in the art.

What is claimed is:

1. In a rotary internal combustion engine of the type having a housing with a peripheral inner wall surface defining a multi-lobe cavity and in which a rotor is eccentrically supported for planetary rotation and wherein said rotor periphery defines with the housing a plurality of working chambers which expand and contract in volumetric size as the rotor rotates, an improved ignition device in said housing comprising:

a. a spark plug having an elongated electrode means disposed centrally thereof and forming at one end of the spark plug one part of a spark-gap;
b. support means in the housing for receiving and supporting said spark plug so that said spark-gap end portion defines with said support means an ante-chamber in close spaced relation to the inner peripheral wall of the housing; and
c. an ignition channel for communicating the ante-chamber with successive working chambers;
d. said channel being of small size relative to the size of the ante-chamber and disposed with its longitudinal axis in offset relationship with the electrode means in a direction counter to the direction of rotor rotation and extending substantially parallel to the longitudinal axis of the central elongated electrode means.

2. The apparatus of claim 1 wherein said support means is a hollow insert, closed at one end, and secured in an opening in the housing extending from the exterior of the housing through the inner peripheral surface of the housing.

3. The apparatus of claim 2 wherein said insert has an internally threaded portion and said spark plug has a threaded shank portion threadably receivable in said insert threaded portion.

4. The apparatus of claim 2 wherein said closed end portion of the insert is provided with said ignition channel.

5. The apparatus of claim 1 wherein said support means has a wall portion separating the working chambers from said ante-chamber and which partly defines said ante-chamber, the surface of the wall portion partly defining the ante-chamber being a substantially flat, planar surface.

6. The apparatus of claim 1 wherein said support means has a wall portion separating the working chambers from said ante-chamber and which partly defines said ante-chamber, the surface of the wall portion partly defining the ante-chamber being of substantially inverted conical configuration.

* * * * *